UNITED STATES PATENT OFFICE.

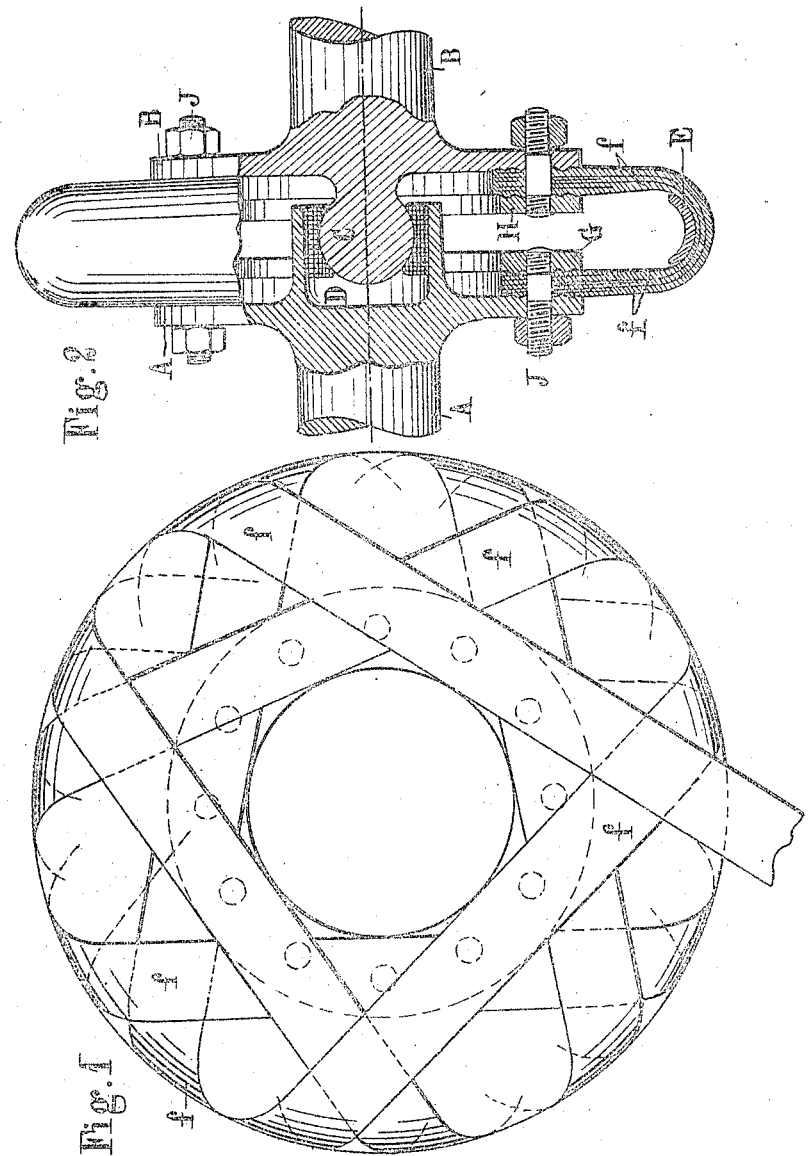

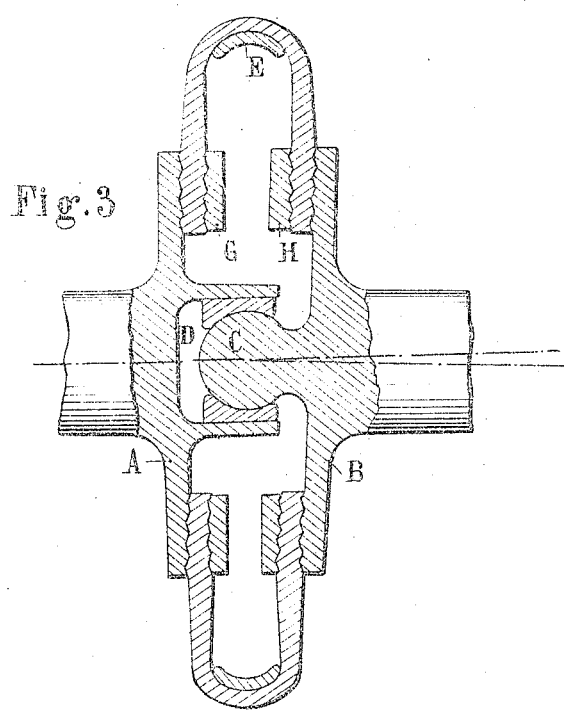

ARTHUR CONSTANTIN KREBS, OF PARIS, FRANCE, ASSIGNOR TO SOCIÉTÉ ANONYME DES ANCIENS ETABLISSEMENTS PANHARD & LEVASSOR, OF PARIS, FRANCE.

FLEXIBLE JOINT FOR COUPLING TWO TRANSMISSION-SHAFTS.

1,107,315.   Specification of Letters Patent.   Patented Aug. 18, 1914.

Application filed August 14, 1912.   Serial No. 714,973.

*To all whom it may concern:*

Be it known that I, ARTHUR CONSTANTIN KREBS, a citizen of the Republic of France, and a resident of the city of Paris, Republic of France, have invented a certain new and Improved Flexible Joint for Coupling Two Transmission-Shafts, of which the following is a description.

Prior to my invention, when it had been desired to transmit power from one shaft to another, where the shafts are substantially in line, but a certain degree of angular motion of one shaft with respect to the other must be permitted, a so-called Cardan joint has generally been used. The most serious objections to the Cardan joint are that no matter what form it takes, it is always subject to a sliding or rotary friction which absorbs power, generates heat and causes wear. Also, being subjected generally to considerable centrifugal force, it is very difficult to keep this part properly lubricated, particularly when used in connection with motor car driving gears in which the Cardan joint is exposed to dirt, dust, and moisture.

The object of my invention is to produce an improved flexible joint, particularly adapted to use in connection with motor car driving gears, which joint is designed to replace the Cardan joint and to eliminate the friction, wear, and necessity for lubrication incident thereto.

The device is illustrated in the drawings accompanying the specification, in Figure 1 of which is shown a front elevation of the device; in Fig. 2 a side elevation of the device partly in section; and in Fig. 3 a diagrammatic view showing the operation of the device in connection with two shafts at an angle to one another.

Referring to Fig. 2, A indicates one of the shafts, to be coupled, say, the driving shaft, and B indicates the other shaft, say the driven shaft. Each of these shafts terminates in a disk slightly larger in diameter than the shafts and disposed in a plane at right angles to the axis of the shaft.

At the end of shaft A is formed a socket D in which fits a ball C carried by shaft B. This arrangement insures a meeting of the axes of shafts A and B at a definite point and prevents lateral and longitudinal motion of the shafts with respect to one another, although permitting angular motion.

A metal ring E, larger in diameter than the disks is arranged in a plane parallel with the normal plane of the disks, and has its outer surface rounded.

Connecting the disks are a series of ligaments $f$, which are preferably made from a continuous piece of flexible material. This strip of flexible material is wound as follows: Starting tangentially to one of the disks, it passes over the ring E, thence along the surface of and tangentially to the other disk, thence over the ring E and along the surface of and tangentially to the first disk, and so on, until it forms a net-work of polygonal elements, connecting the two disks and passing over the ring E, and, if the winding operation is continued a sufficient length of time, forms a complete oblate spheroid with holes at the ends of its shortest diameter through which the shafts pass.

Between the disks are disposed two clamping rings G and H. The ligaments pass between the disks carried by the shafts and the clamping rings and are secured between the disks and clamping rings by means of bolts J.

The ligaments may be of any suitable material, such as bands or cords of a textile material, or steel wires or bands, and, when assembled in the form shown in the drawings, may be glued to each other and covered with a suitable elastic coating, such as rubber, the surface thus formed presenting a smooth appearance similar to that of pneumatic tires for motor car wheels, and if the covering is suitably chosen, may be water-proof.

The operation of my improved device is as follows: The driving shaft A in rotating, will transmit a torsional effort to the driven shaft B by pulling upon the ligaments located tangentially to the driving shaft and in a line with the effort transmitted. For instance, (referring to Fig. 1) if the system is assumed to be rotating in a clockwise direction, the effort will be transmitted along the ligaments extending in a counter-clockwise direction tangentially to the disk. When the two shafts are in alinement, no deformation of the system takes place except that due to the elasticity of the material used in the ligaments. If, however, the two shafts form an angle, with each other, as in Fig. 3, the spheroid will be slightly deformed, as shown in the figure, without requiring any perceptible elongation of the ligaments.

While I have only shown and described one form of my invention, it is obvious that it may be varied within wide limits as to the nature of the material, proportion of the parts and general arrangement thereof, without departing from the spirit of my invention.

What I claim and desire to secure by Letters Patent is—

1. In a device of the kind described, a driving disk, a driven disk, a ring member of larger diameter than the disks and a plurality of ligaments passing over said ring member and connecting said disks.

2. In a device of the kind described, a driving disk, a driven disk, a ring member of larger diameter than the disks and arranged in a plane parallel to the normal planes of the disks, and a plurality of ligaments passing over said ring member and connecting said disks.

3. In a device of the kind described, a driving disk, a driven disk, a ring member of larger diameter than the disks arranged in a plane parallel to the normal planes of the disks, and a plurality of ligaments passing over said ring member connecting the said disks and arranged tangentially to them.

4. In a device of the kind described, a driving disk, a driven disk, a ring member, a plurality of ligaments carrying said ring member and arranged tangentially to said disks, two clamping rings and means for securing the ligaments between each of the disks and a clamping ring.

5. In a device of the kind described, a driving disk, a driven disk, a ring member of larger diameter than the disks, a plurality of ligaments connecting the two disks and arranged tangentially thereto and passing over the ring member, two clamping rings and means for securing the ligaments between each of the disks and a clamping ring.

6. In a device of the kind described, a driving shaft, a driven shaft, and connecting means for the shafts disposed between them and comprising a continuous band of flexible material wound to form an oblate spheroid.

7. In a device of the kind described, a driving disk, a driven disk, a ring member of larger diameter than the disks, and a continuous band of flexible material wound between the disks and over the ring member to form an oblate spheroid.

In testimony whereof I have signed this specification in the presence of two subscribing witnesses.

ARTHUR CONSTANTIN KREBS.

Witnesses:
EMILE LEBRET,
H. C. COXE,